Figure 7:
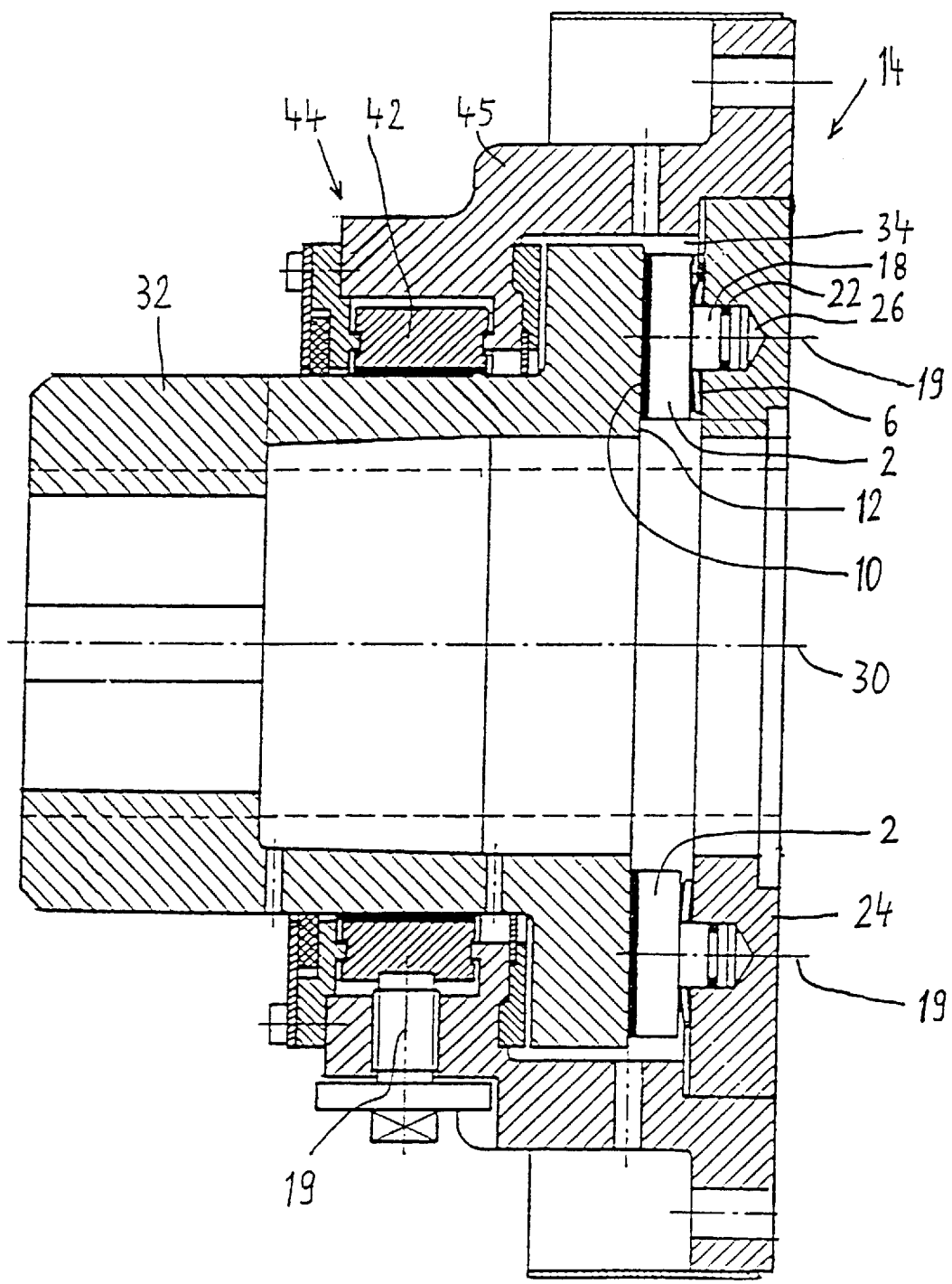

United States Patent
Wyndorps et al.

[11] Patent Number: 5,876,125
[45] Date of Patent: Mar. 2, 1999

[54] SLIDE SHOE FOR PLAIN BEARING USE

[75] Inventors: Paul Wyndorps, Mönchengladbach; Bernd Negwer, Andernach; Albert K. Schmitz, Hemmingen, all of Germany

[73] Assignee: Renk Aktiengesellschaft, Germany

[21] Appl. No.: 975,281

[22] Filed: Nov. 20, 1997

Related U.S. Application Data

[63] Continuation of Ser. No. 691,245, Aug. 2, 1996, abandoned.

[30] Foreign Application Priority Data

Aug. 2, 1995 [DE] Germany .................. 195 28 339.2

[51] Int. Cl.$^6$ ....................................... F16C 17/06
[52] U.S. Cl. ...................... 384/306; 384/122; 384/308
[58] Field of Search ................... 384/121, 122, 384/124, 306–312

[56] References Cited

U.S. PATENT DOCUMENTS

| | | | |
|---|---|---|---|
| 1,117,504 | 11/1914 | Kingsbury | 384/307 |
| 1,390,131 | 9/1921 | Howarth | 384/308 |
| 1,880,353 | 10/1932 | Michell | 384/309 |
| 3,142,519 | 7/1964 | Abramovitz | 384/308 |
| 4,240,676 | 12/1980 | Anderson et al. | 384/112 |
| 4,886,378 | 12/1989 | Matake | 384/124 X |
| 5,013,947 | 5/1991 | Ide | 384/309 X |
| 5,282,097 | 1/1994 | Ide | 384/122 |
| 5,441,347 | 8/1995 | Ide | 384/122 |

FOREIGN PATENT DOCUMENTS

| | | |
|---|---|---|
| 19680 B | 8/1986 | Austria . |
| 0080804 | 6/1983 | European Pat. Off. . |
| WO 91/19112 | 12/1991 | European Pat. Off. . |
| WO 95/28574 | 10/1995 | European Pat. Off. . |
| 434151 | 9/1926 | Germany . |
| 667761 | 11/1938 | Germany . |
| 1775557 | 8/1972 | Germany . |
| 2359062 | 5/1974 | Germany . |
| 2626751 | 12/1977 | Germany . |
| 35 22 037 A/1 | 1/1987 | Germany . |
| 43 43 965 A/a | 6/1995 | Germany . |

*Primary Examiner*—Thomas R. Hannon
*Attorney, Agent, or Firm*—Barnes & Thornburg

[57] ABSTRACT

Slide shoe for use in a plain bearing, notably in an axial thrust bearing. The outer periphery (50) of the slide shoe has below its sliding surface (10) a peripheral recess (52) through which the slide shoe rim area (56) that features the appropriate rim area of the sliding surface (10), can flex into the peripheral recess (52) when the sliding surface (10) expands under the effect of temperature more heavily than the deeper part of the slide shoe.

4 Claims, 2 Drawing Sheets

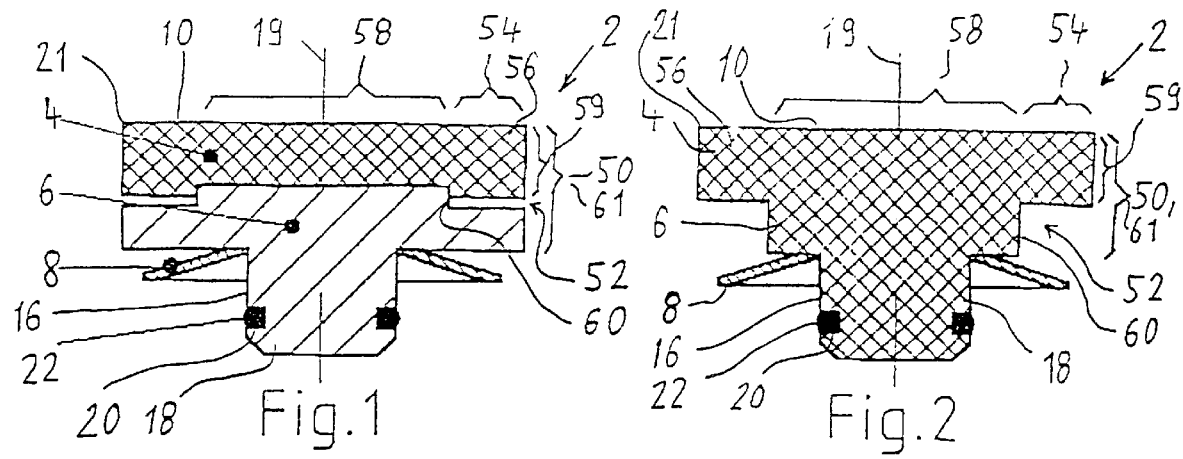
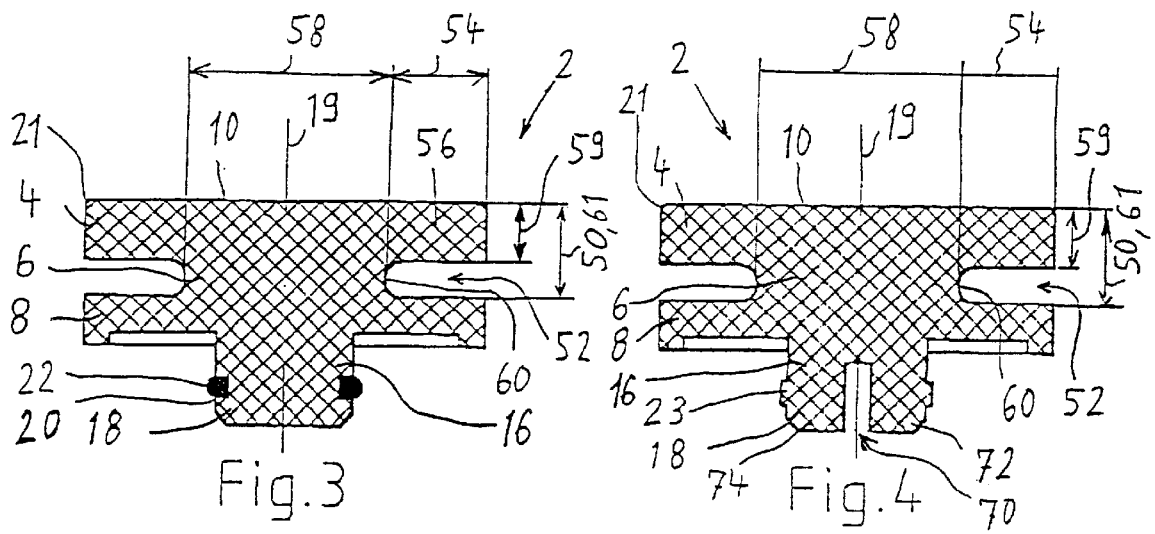
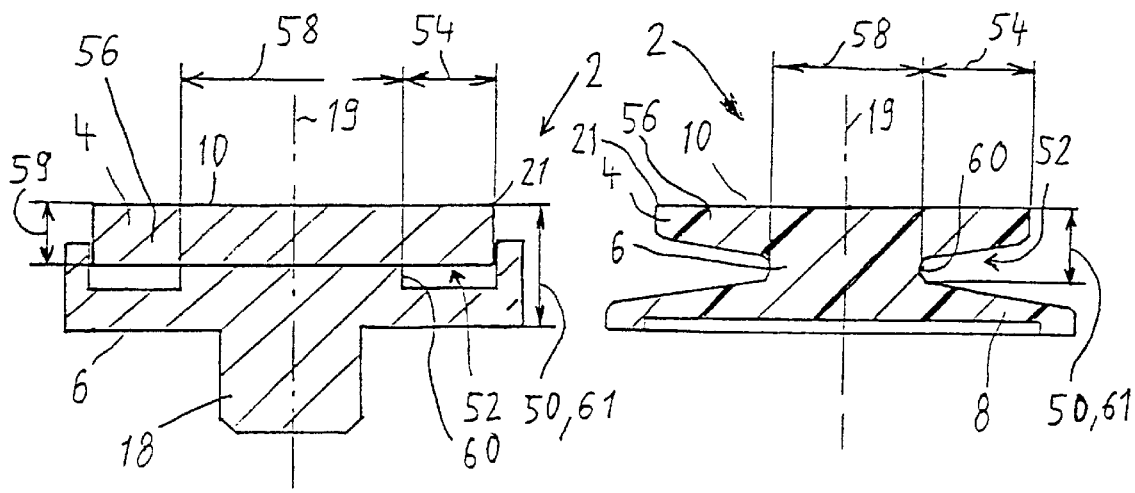

SLIDE SHOE FOR PLAIN BEARING USE

This is a continuation of application Ser. No. 08/691,245 filed Aug. 2, 1996 now abandoned.

The invention relates to a plain bearing slide shoe for use in a plain bearing, according to the preamble of claim 1.

The invention relates particularly to a slide shoe for use in an axial plain bearing.

PRIOR ART

DE-A 43 43 965 shows circularly cylindrical slide shoes with a supporting disk spring.

U.S. Pat. No. 1,117,504 shows circularly cylindrical slide shoes with a sliding surface on one end face and a spherical support surface on the other end face.

U.S. Pat. No. 3,142,519 shows segmented slide shoes.

DE-A 35 22 037 shows a radial plain bearing with radially acting tiltable slide shoes.

DESCRIPTION OF THE INVENTION

The objective of the invention is fashioning the slide shoes to the effect that they can be made not only of steel, but also of a material with a distinctly lower modulus of elasticity than steel, preferably of plastic. Moreover, the objective of the invention is fashioning the slide shoes to the effect that the slide shoe geometry adjusts at varying operating temperatures of the bearing automatically to optimum values for any operating temperature.

Furthermore, the objective of the invention is fashioning the slide shoe to the effect that it allows easy and low-cost manufacture. These objectives are met by the patent claims.

Further features of the invention are contained in the subclaims.

The invention is described hereafter with reference to the drawing with the aid of preferred embodiments, as examples. The drawing shows in:

FIG. 1, schematically an axial section through a multiple part slide shoe according to the invention;

FIG. 2, schematically an axial section through a slide shoe according to the invention, where some of its parts are made together of an integral body;

FIG. 3, schematically an axial section through a slide shoe according to the invention, which together with a disk spring consists of an integral body;

FIG. 4, schematically an axial section of a slide shoe according to the invention, which together with a disk spring and a pin with an annular collar consists of an integral body;

FIG. 5, schematically an axial section through a two-part slide shoe according to the invention;

FIG. 6, schematically an axial section through a single-part slide shoe according to the invention, which does not have a positioning pin;

FIG. 7, an axial section through a combination axial bearing and radial bearing.

The invention relates to a slide shoe 2 whose functions can be distributed to the following parts: a sliding pad 4, a holder part 6, a compression spring 8, e.g., in the form of a disk spring, for equalization of level differences between a sliding surface 10 of the sliding pad 4 and a thrust surface 12 (FIG. 7) opposing it and rotating relative to it, of an axial plain bearing 14, and to a holding device 16 which may consist of a pin 18 protruding axially away from the holding part 6 in the opposite direction of the sliding surface 10, and to a radially elastic guide ring 22 (lock washer, rubber ring) sitting on it in an annular groove 20 and protruding radially while serving the pivotable mounting of the slide shoe 2 in a cylindrical opening 26 of the support body 24, according to FIG. 7. The peripheral edge 21 of the sliding surface 10 is smoothed down. The plain bearing 14 is an axial plain bearing, and its support body 24 extends annularly around the bearing axis of rotation 30. A plurality of slide shoes 2 are mounted annularly around the bearing axis of rotation 30, on the support body 24. The slide shoes 2 are axially acting plain bearing elements. The thrust surface 12 is arranged on a bearing support body 32, annularly in a plane radially to the bearing axis of rotation 30. The sliding surfaces 10 of the slide shoes 2 bear at bearing standstill on the thrust surface 12. With the bearing support body 32 rotating relative to the support body 24 and slide shoes 2, about the bearing axis of rotation 30, lubricant from the lubricant space 34 formed between them is forced between the sliding surfaces 10 and the fist surface 12. As a result, the slide shoes 2 tilt with their center axis 19 relative to the bearing axis of rotation 30 from their previously axially parallel position to an inclined position, creating between the sliding surface 10 and the thrust surface 12 a wedge-shaped lubrication clearance with lubricant that separates the sliding surfaces 10 from the thrust surface 12. The temperature and pressure generated in the lubrication clearance in the operation of the bearing depend on the speed of rotation and mechanical load on the bearing. Pressure and temperature-dependent form changes occur thereby in the slide shoe 2. To safely prevent the pressure and temperature-dependent deformations of the slide shoe from imparting to the sliding surface 10 a concave shape, the sliding surface 10 of the slide shoes 2 is given a slightly convex crowning in the production, of about 10 $\mu$m. The size of the crowning and its radius vary during the operation of the bearing as a function of pressure and temperature, notably of the difference between the temperature on the sliding surface 10 and the temperature in the interior of the slide shoe 2. At the start of rotation, the bearing temperature equals the ambient temperature. During operation, the bearing temperature can vary, depending on bearing speed of rotation and mechanical load.

One of the two support bodies 24 or bearing support body 32 is nonrotatable while the other is rotatable. In the vertical bearing relative to FIG. 7, the support body 24 is nonrotatable and the bearing support body 32 (runner), which can be joined nonrotatably to a shaft, is arranged rotatably.

The invention is described with reference to the axial plain bearing 14. However, it is applicable analogously also to radially acting slide shoes 42 of a radial plain bearing 44. FIG. 7 shows a combination axial plain bearing 14 and radial plain bearing 44 with bearing support body 32 and bearing housing 45.

According to the invention, periphery 50 of the slide shoes 2 (and correspondingly also the radial slide shoes 42) is provided with a peripheral recess 52 due to which the slide shoe rim area 56 disposed above the recess 52 and forming a rim area 54 of the sliding surface 10 can flex, starting from the slide shoe center area 58 at the bottom 60 of recess 52, into said recess 52 on account of the pressure and the temperature differences that occur between the temperature at the sliding surface 10 and the temperature in the deeper areas of the slide shoe 2 beneath it as the plain bearing rotates.

The advantage achieved thereby is that the slide shoe geometry adjust for any operating temperature and any mechanical load automatically to an optimum value. This makes it possible to use for the slide shoe, instead of the previously used steel material, other materials which have a distinctly lower modulus of elasticity than steel. This provides the option of using, e.g., plastic materials.

Due to the peripheral recess 52, the sliding pad 4 of the slide shoe 2 is in the direction of its bearing load not supported full face, but through its holder part 6 only to a part 58 of its sliding surface 10. This enables the said flexure, or bending, in the rim area 54 of the sliding pad 4 under mechanical and thermal load, to the effect that a good geometry of the clearance formed between the sliding surface 10 and thrust surface 12 (FIG. 7) adjusts automatically for any operational situation.

The slide shoe 2 has preferably a circularly cylindrical form with a center axis 19. Deviating thereof, the slide shoe 2 may also be formed differently, for example, may have the form of annular segments.

According to the drawing figures, the peripheral recess 52 extends preferably around the entire circumference of the slide shoe. This makes the slide shoe equally suitable for both bearing directions of rotation, also when the sliding shoe is at its assembly or during operation turned about its center axis 19 to any position. The peripheral recess 52 is the most important, viewed in the running direction of the slide shoe relative to the thrust surface 12, on its approach edge.

The compression spring 8 and holding device 16 form together pivotal means which enable the slide shoe 2 to tilt transverse to its center axis 19 and, thus, also transverse to the bearing axis of rotation 30. In the case of radial slide shoes 42, in FIG. 7, their center axis 19 is aligned radially to the bearing center axis 30, in untilted state, and is able to tilt around the bearing axis of rotation 30 in a nonradial direction.

The embodiments according to FIG. 2 through 6 contain the same inventional features as described with reference to FIG. 1. Only the differences will be described hereafter.

In the embodiment according to FIG. 2, the sliding pad 4 and its holding part 6 consist together integrally of a single body. Said body may consist of steel or other material with a distinctly lower modulus of elasticity, for instance plastic material.

In the embodiment according to FIG. 3, the compression spring 8 used to equalize level differences in the bearing is integrated in the slide shoe, so that said compression spring 8, holder part 6 and sliding pad 4 consist together of an integral body.

In the embodiment according to FIG. 4 there is provided, in lieu of a guide ring 22, an annular collar 23 which is a single-piece body with the other parts of the slide shoe 2.

Moreover, the pin 18 is in the area of the annular collar 23 slotted longitudinally, preferably by a slot 70 extending diametrally completely through it and axially over more than three-fourths of its length. Pin 18 is thereby split in two (or more) finger type pin parts 72 and 74, which radially can be squeezed together elastically. This elasticity replaces the elasticity of the guide ring 22. Said guide ring 22 or annular collar 23 is needed to radially and axially fix the slide shoe 2 within the opening 26 of support body 24 in which it is received, and to enable it to perform more easily and in preset ways the said tilt movements.

FIG. 5 shows an embodiment similar to FIG. 1. In FIG. 1, the holder part 6 engages a front recess of the sliding pad 4 on its side away from the sliding surface 10, in order to position the two parts radially relative to each other. In FIG. 5, the sliding pad 4 sits in a front recess of the holder part 6 so as to position the two parts relative to each other.

FIG. 6 shows an embodiment where the slide shoe 2 consists integrally only of the sliding pad 4, holder part 6 and compression spring 8. The disk-shaped compression spring 8 of FIG. 6 has a diameter larger than that of all other parts of the slide shoe 2. The advantage of this is that the compression springs 8 of adjacent, similarly fashioned slide shoes 2 can support one another in the peripheral direction of the bearing, without disturbing the tiltability of their sliding pads 4. An additional advantage is that the lubricant can drain faster from the individual slide shoes 2 and allow the inflow of fresh lubricant, thereby reducing the generation of heat in the slide shoe, notably in the sliding pad 4. While the peripheral recess 52, viewed in axial section of the slide shoes 2, has in the embodiments according to FIG. 1 through 5 a substantially rectangular shape, and with it also the flexible rim section 54 of the sliding pad 4 and, in FIG. 3 and 4, also the compression spring 8, have each a rectangular cross section, the peripheral recess in the embodiment according to FIG. 6 is fashioned so as to get larger, in wedge shape, from the inside outward. As a result, the sliding pad 4 can be fashioned in its rim area 54 and/or the compression spring 8 radially, from the inside outward, with a decreasing thickness. This measure allows distributing the mechanical load, notably the bending stress in the compression spring 8 and sliding pad 4, more evenly and to save material. This measure also improves the automatic adjustment of the optimum slide shoe geometry, namely, the crowned shape of the sliding surface 10, during operation.

Slide shoes according to the invention can be used, e.g., to axially support marine propeller shafts and for axial mounting of turbine shafts. While prior slide shoes function quite satisfactorily, they have the disadvantage that due to using metallic sliding surfaces a high frictional material wear can occur in startup and coasting (rotational speed reduction down to standstill) of the shafts. To keep the wear of the sliding surfaces low, particularly on their approach edges, the use of softer bearing materials is desirable. A disadvantage of commercially available slide shoes is constituted in that bearing materials often are used that contain arsenic, cadmium or lead, which in part migrate into the lubricant. Both the disposal of the lubricant and the disposal of worn slide shoes 2 represent an environmental pollution problem.

According to the invention, plastic can be used as bearing material for the sliding pad 4 and its sliding surface 10, but also for other parts of the slide shoe. When using plastic as bearing material, the sliding surface wear is generally low and, owing to the very often good sliding properties of the plastic, lubricant is dispensable or, at least, a lubricant with lower additive content can be used for lubrication, mostly oil and partly even water. Many plastic materials allow recycling.

The function of the bearing depends greatly on a slightly mushroom-shaped or crowned form of the slide shoes, in operation. The size of this crowing ranges in the bearing operation at about 10 $\mu$m to 30 $\mu$m. This mushroom shape (crowning) aids the formation of a convergent lubrication clearance between the sliding surface 10 of the sliding pad 4 and an opposite thrust surface 12 in which the lubricant accumulates. The occurring pressure corresponds to the load-bearing capacity of the bearing.

Commercially available metallic slide shoes 2 are produced by their manufacturers with a crowing of about 10 $\mu$m. This facilitates the startup (starting procedure) of the slide shoes 2. In the operation of the bearing, a different mushroom shape (crowning) of the slide shoe adjusts then automatically, substantially due to the thermal expansion of the slide shoe. Owing to the high modulus of elasticity of metals, the deformation of a slide shoe made of metal, by the mechanical bearing pressure, is negligibly small.

When using plastic for the prior slide shoes, the thermal change of geometry is insufficient to automatically effect for all operating situations of a bearing the optimum mushroom shape (crowning) during bearing operation. In the fabrication of a slide shoe, the mushroom shape (crowning) of its sliding surface 10 can be adapted only for a specific operational situation, which depends particularly on the parameters temperature, lubricant viscosity, mechanical bearing load, time progression of the mechanical load, surface finishes, type of bearing material etc. These parameters changing in the operation of a bearing, it is desirable for the slide shoe geometry to adjust itself automatically to the optimum for each operational situation.

The option of spring deflection, i.e., flexure of the rim area 54/56 of the sliding pad 4 in the direction of the peripheral recess 52 allows exactly said mushroom shape or crowning of the slide shoe that adjusts itself optimally, for example, also when the sliding pad 4 or the entire slide shoe 2 is made of plastic. The invention teaches a geometric form of the slide shoe that is suited especially for the use of plastic materials.

The further features of the invention save manufacturing costs and reduce the number of parts needed for a slide shoe.

The sliding surface 10 may be formed by the sliding pad 4 itself or by a layer of a different material applied on it.

For the size of the crowning of the sliding surface 10 to be able to adjust automatically to optimum values in contingence on temperature-dependent material expansions, it is important that the axial thickness 59 of the rim section 56 above the peripheral recess 52 be considerably smaller than the axial thickness 61 of the slide shoe 2 in its center area 58, radially within the recess 52. In the operation of the bearing, a temperature higher than in the deeper areas of the slide shoe 2 beneath the sliding surface 10 occurs in the sliding surface 10. The peripheral recess 52 is in all embodiments such that the crowning of the sliding surface 10 becomes greater as the temperature difference becomes greater as well.

We claim:

1. An axial plain bearing slide shoe having a circularly cylindrical shape with an axis (19), a sliding surface (10) on a first end face for resting on an approach surface of an axial plain bearing which rotates relative to it, a compression spring (8) in the form of a saucer on a second end face of the slide shoe facing away from the sliding surface (10) for axial support of the slide shoe on a carrier element of the axial plain bearing, an axial pin (18) on said second end face, the pin including means (23, 70, 72, 74) by which it can be positioned radially in a cylindrical opening of the carrier element while being retained pivotally, the saucerlike compression spring (8), the pin (18), the means (23, 70, 72, 74) for its pivotal positioning, and the part of the slide shoe provided with the sliding surface (10) together forming an integral element, the integral element being provided around its entire circumference with a peripheral recess (52) that divides the integral element into the saucerlike compression spring (8) and a sliding pad (4), the sliding pad (4) being provided with the sliding surface, an edge area of the sliding pad (4) comprising an edge area (54) of the sliding surface (10) bending into the peripheral recess (52) as the temperature of the slide shoe rises during the operation of the axial plain bearing because of a thermal material expansion, the said means (23, 70, 72, 74) including an annular collar (23) formed integrally on the pin (18), the pin having an end which is slotted (70) in a longitudinal direction beyond the collar (23) and thereby divided into fingerlike pin parts (72, 74) which are radially resiliently compressible.

2. An axial plain bearing slide shoe according to claim 1 wherein the integral element consists of plastic.

3. An axial plain bearing slide shoe according to claim 2 wherein the slide shoe (10) comprises a material layer applied on the sliding pad (4), said layer consisting of a material other than the material from which the sliding pad (4) is constructed.

4. An axial plain bearing slide shoe according to claim 1 wherein the slide shoe (10) comprises a material layer applied on the sliding pad (4), said layer consisting of a material other than the material from which the sliding pad (4) is constructed.

* * * * *